United States Patent [19]

Orain et al.

[11] 4,365,791
[45] Dec. 28, 1982

[54] COIL SPRING HAVING A SMALL AXIAL AND RADIAL OVERALL SIZE

[75] Inventors: Michel A. Orain, Conflans-Ste. Honorine; Roger P. Thiault, Saint-Ouen-l'Aumone, both of France

[73] Assignee: Glaenzer Spicer, Poissy, France

[21] Appl. No.: 339,056

[22] Filed: Jan. 13, 1982

Related U.S. Application Data

[63] Continuation of Ser. No. 115,938, Jan. 28, 1980, abandoned.

[30] Foreign Application Priority Data

Feb. 19, 1979 [FR] France .................... 79 04113

[51] Int. Cl.³ ............................................. F16F 1/34
[52] U.S. Cl. .................................... 267/166; 464/111
[58] Field of Search .................. 267/60, 61 R, 62, 71, 267/160, 166, 167, 170, 178–182; 411/153; 464/111, 113

[56] References Cited

U.S. PATENT DOCUMENTS

| | | | |
|---|---|---|---|
| 1,751,261 | 3/1930 | Wilson | 267/62 |
| 1,886,791 | 11/1932 | Cowlin | 411/153 |
| 2,943,870 | 7/1960 | Davis | 267/180 X |
| 3,613,396 | 10/1971 | Drevard et al. | 464/111 |

OTHER PUBLICATIONS

*Springs,* The Locomotive Publishing Co., London, 1945, vol. 1, p. 60.

*Primary Examiner*—Duane A. Reger
*Attorney, Agent, or Firm*—Wenderoth, Lind & Ponack

[57] ABSTRACT

In one embodiment the spring comprises a coil which extends through a coiling angle which is slightly less than 360°. The end portions of the coil are curved in a direction for decreasing the pitch of the helix in the working position of the spring between two surfaces. This spring assumes such position that it comes in contact at two points with each of these surfaces and the forces are distributed in an excellent manner.

Application in particular to the mounting of rollers on trunnions of homokinetic tripod joints.

10 Claims, 19 Drawing Figures

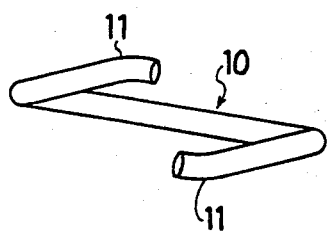
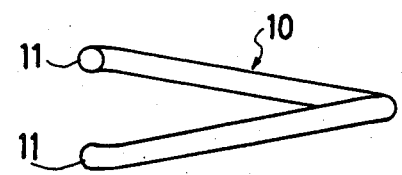
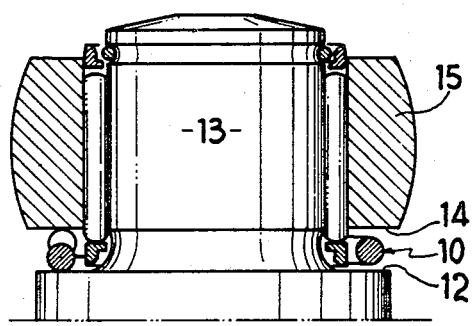
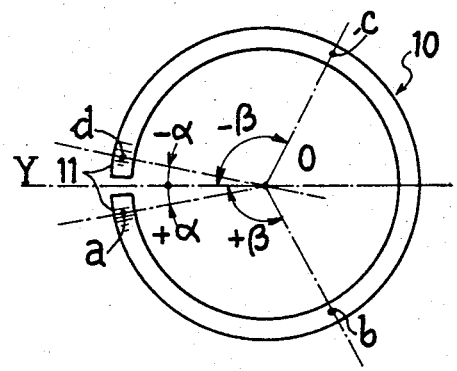
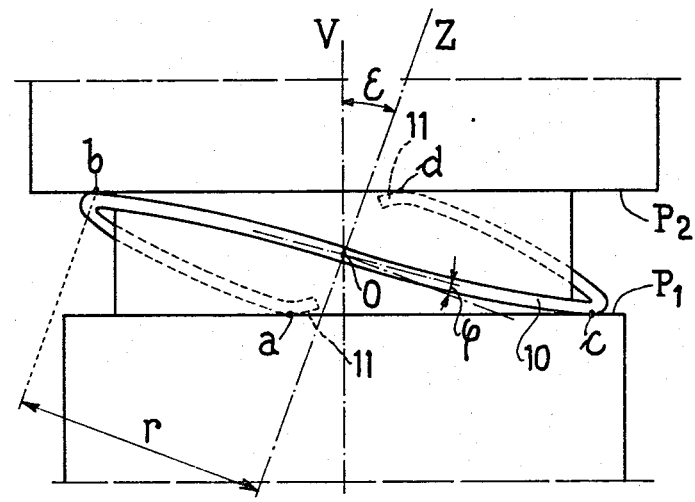

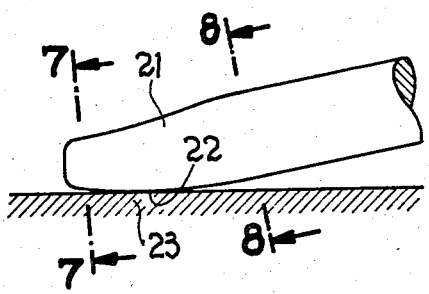
FIG_6
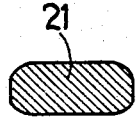
FIG_7
FIG_8
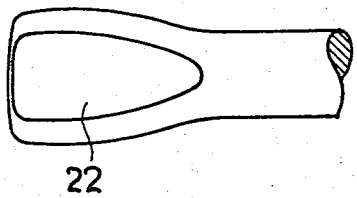
FIG_9
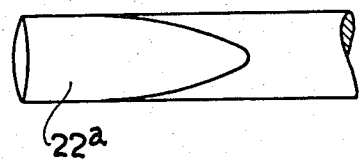
FIG_11
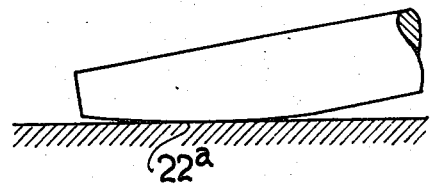
FIG_10
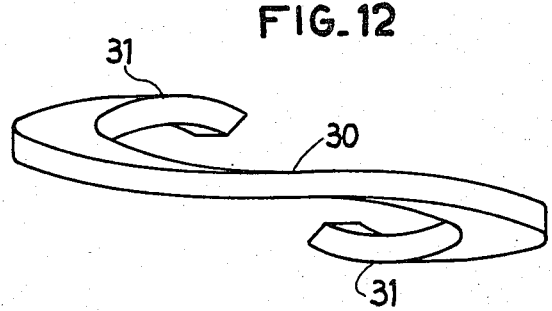
FIG_12

U.S. Patent Dec. 28, 1982 Sheet 3 of 3 4,365,791
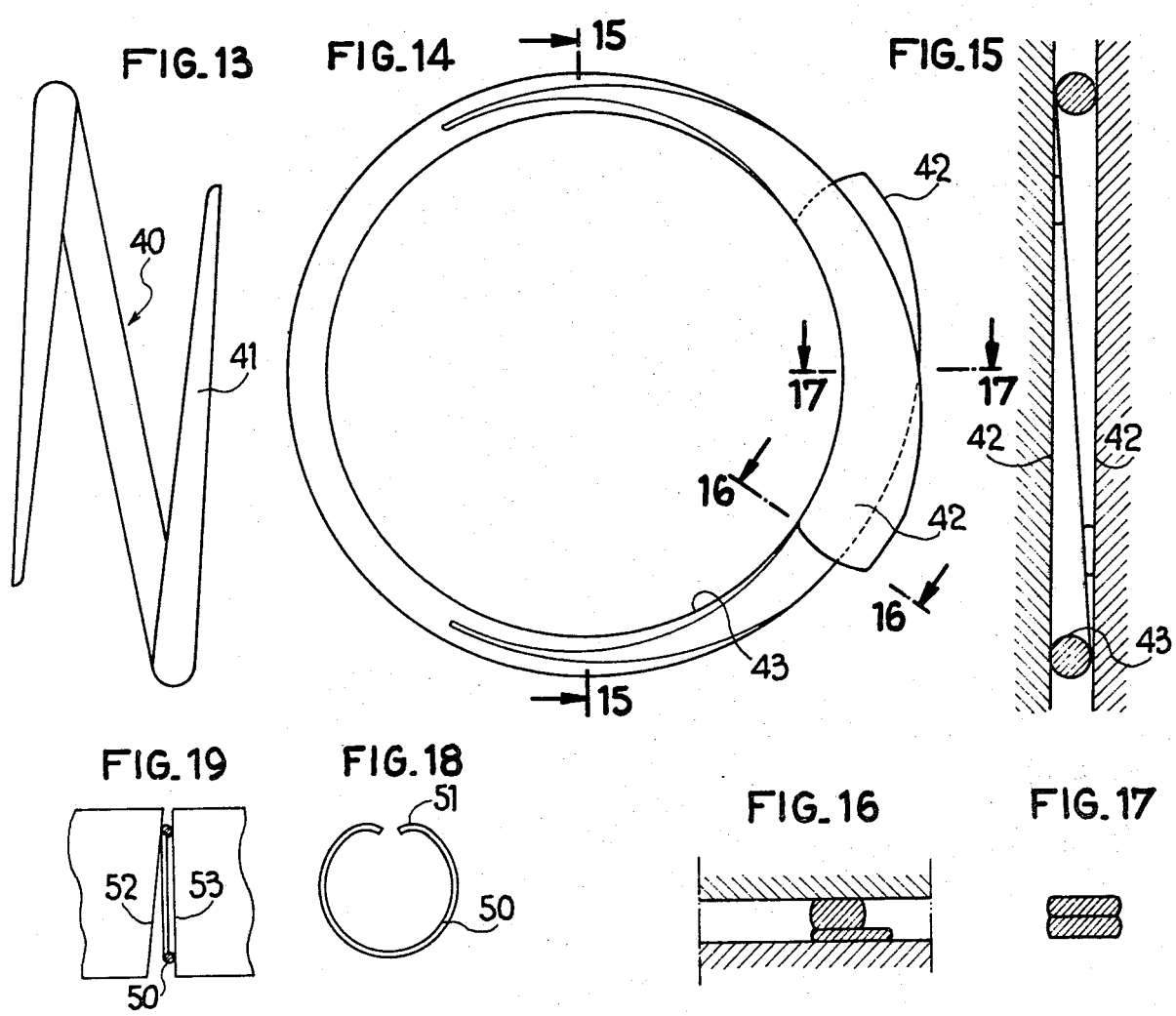

COIL SPRING HAVING A SMALL AXIAL AND RADIAL OVERALL SIZE

This is a continuation of application Ser. No. 115,938, filed Jan. 28, 1980, now abandoned.

The present invention relates to springs which must have an overall size which is as small as possible in both the axial and radial direction, when they are freely mounted and compressed axially between two adjacent elements.

In some applications, and in particular in a homokinetic tripod joint, it is desirable to employ, for biasing the rollers rotatably and slidably mounted on their trunnions, such springs having a very small axial and radial overall size. The sliding travel of the rollers is about 1 mm and however a relatively large force must be available for urging the roller outwardly so as to take up the clearance when the torque exerted on the joint is zero. This thrust must moreover be roughly constant throughout the sliding travel of the roller. Now, presently available springs do not enable this problem to be solved in a really satisfactory manner. In particular, washers of elastomeric material do not provide a constant force throughout the sliding travel of the roller and they by no means stand up well to use over a period of time.

British Pat. No. 152,323 discloses a spring having one end which is anchored and another end which receives the load. It consequently operates under bending stress and does not provide any element solving the problem posed in an application such as that mentioned hereinbefore.

U.S. Pat. No. 3,141,661 discloses an arrangement which does not satisfy the required conditions either, since the spring disposed between the two blocks extends through more than 360° and comprises two planar end portions which impart to the spring in the compressed position a thickness which is double that of the material from which the spring is made.

U.S. Pat. No. 3,649,000 discloses a device for fixing the ends of coaxial coil springs which are angularly offset. These springs operate in a very different way and consequently the problem posed is not solved.

The Dutch Pat. No. 25,888 discloses a stop nut comprising a coil spring whose projection onto a plane perpendicular to its axis has an oval or elliptical shape and which moreover is curved, for example along the major axis of the helix, so as to provide an additional tension after the normal compression of the spring. However, a stop nut works in a static manner and in no way produces a substantially constant thrust through a marked axial travel.

Under these conditions, the problem that the invention is intended to solve may therefore be put in the following way: provide a spring which has a very small axial and radial overall size and yet possesses improved features as concerns the value and the constancy of the elastic return force exerted and a good performance over a period of time and a centering relative to the associated part which is ensured under all circumstances.

This result is achieved by means of a helical coil spring of wire which is adapted to be freely mounted between two adjacent elements and comprises a single coil whose maximum deflection is equal to a plurality of times the thickness, in the axial direction, of the wire forming said coil and whose axial overall size is equal to said thickness in the compressed position.

In a first embodiment, the single coil extends through an angle which is slightly less than 360° and its free end portions are preferably bent in the direction which reduces the pitch of the helix of the free spring.

In a second embodiment, the coil extends through an angle exceeding 360°, for example between 420° and 540°, and the portions of the spring which overlap have a thickness which progressively decreases in the direction toward the free ends of the spring.

The invention will now be described in more detail hereinafter with reference to the accompanying drawings which are given merely by way of example and in which:

FIG. 1 is an elevational view of a spring according to the invention in the free state;

FIG. 2 is a side elevational view of the spring of FIG. 1;

FIG. 3 is a plan view thereof;

FIG. 4 is a diagrammatic side elevational view showing the shape that the spring assumes in its working position;

FIG. 5 shows an example of the assembly of such a spring in a homokinetic tripod joint;

FIG. 6 shows to an enlarged scale a modification of the shape given to the end portions of the spring;

FIGS. 7 and 8 are two sectional views taken on lines 7—7 and 8—8 respectively of FIG. 6;

FIG. 9 shows the spade shape given to the end portion of the spring shown in FIGS. 6 to 8;

FIG. 10 is a view similar to that of FIG. 7 of another modification;

FIG. 11 is a view similar to that of FIG. 9 of this new modification;

FIG. 12 is a side elevational view of a spring according to the invention which has a rectangular section;

FIG. 13 is a side elevational view showing another embodiment of such a spring in the free state;

FIG. 14 is a plan view thereof;

FIG. 15 shows the same spring as FIG. 13 in a compressed position;

FIGS. 16 and 17 are two sectional views taken on lines 16—16 and 17—17 respectively, and FIGS. 18 and 19 illustrate an example of a process for producing a spring such as shown in FIGS. 13 to 17.

FIGS. 1 to 3 show a coil spring 10 comprising a single coil of a round-section steel wire. This coil has a circular shape in plan and extends through a coiling angle which is slightly less than 360° (see FIGS. 1 and 3) and its two end portions 11 are slightly curved in the direction which reduces the pitch of the helix defined by the spring in the free state. In this way, it is ensured that the spring does not come in contact with the adjacent parts through the end edges of the coil.

Somewhat surprisingly, it has been found that, in the working position, that is to say when it is partly compressed between two adjacent elements, the spring just described is in contact at two points with each of the two planes $P_1$ and $P_2$ between which it is compressed. In other words, its elastic force is applied at two points of its periphery, on each of these two planes (FIG. 4).

This feature will be illustrated by a concrete example:

Characteristics of the spring:

Diameter of the wire: $D = 1.8$ mm.
Mean coiling radius: $r = 12.5$ mm.

Total deflection of the spring: 13.635 mm for a stress of 100 kg/sq.mm.

Deflection of the spring between its two extreme working positions: 1 mm.

Pitch of the helix in the working position: p=1.083 mm.

Between the two surfaces $P_1$ and $P_2$, the spring assumes a position shown diagrammatically in FIG. 4 and its axis OZ is inclined relative to the perpendicular OV to the planes $P_1$, $P_2$ at an angle $\epsilon$ so that tan $\epsilon$=0.0287. The slope of the helix is given by tan $\phi$=+0.0137 (it is assumed that the spring occupies its mean working position close to the position of maximum compression).

Now, if a, c and b, d represent respectively the points of contact of the spring with the planes $P_1$ and $P_2$ and if $\alpha$ and $\beta$ designate the angles which measure the position of these points relative to an axis OY, shown in FIG. 3, the following results are obtained: the pairs of points a,b and c, d are symmetrically disposed relative to the axis OY and the angle $\alpha$ and $\beta$ are respectively equal to 13° and 118.4°.

Further, the elastic force which tends to move the surfaces $P_1$, $P_2$ away from each other is distributed in the following manner:

at a and d: $F_1$=9.160 kg;
at b and c: $F_2$=2.340 kg.

Preferably, in such a spring, its height in the free state represents 6 to 10 times its axial thickness in the compressed state.

The desired results are consequently obtained in such a spring:

as its maximum deflection is much greater than its movement in operation, the elastic force exerted is practically constant throughout this movement;

the elastic work stored in the compressed position is high relative to the overall size in the radial and axial directions;

owing to the contact with the adjacent parts at four points, the transmission of the elastic force is well distributed;

this spring undergoes practically no modification in its characteristics in the course of its life.

FIG. 5 shows an example of the application of such a spring 10 which is disposed between a shoulder 12 of a trunnion 13 of a tripod element and the adjacent face 14 of a roller 15 which is rotatably and slidably mounted on this trunnion. It will be understood that this is merely one example of its application.

It will be observed that the spring is centered relative to the trunnion throughout its length, irrespective of its extent of compression, as opposed to what occurs in some known arrangements. This also constitutes an important advantage.

FIGS. 6 to 9 also show a modification concerning the shape given to the end portions of such a spring.

Thus, in this modification, each of these end portions 21 is flattened and has a spade shape having a convex curvature, for example a cylindrical shape, on its face 22 in contact with the adjacent part 23, as is clearly shown in these Figures. The generatrices of the cylindrical surface are oriented substantially orthogonally to the mean line of the spring.

In another modification shown in FIGS. 10 and 11, the bearing surface 22a of cylindrical shape is obtained by a grinding operation.

The spring may be made from a round-sectioned wire, as in the foregoing embodiments, or from a rectangular- or like-sectioned wire as shown in FIG. 12, if sufficient space is available in the radial direction. On the other hand, this enables the axial overall size to be reduced, or the force developed axially by the spring to be increased, for an acceptable stressing of the material. Here again, curved portions 31 are provided at the ends of the coil 30 to avoid contact between the end edges and the adjacent bearing surfaces. This also enables the previously defined angle $\alpha$ to be increased.

In a second embodiment of a spring according to the invention, the single coil forming it extends through a coiling angle exceeding 360°, for example between 420° and 540°. The spring 40 is then shaped in such manner as to flatten or taper in the direction of its ends 41, as shown in FIGS. 13 and 15 while it retains a constant, or substantially constant, section (see FIGS. 14, 16 and 17). This flattening is produced in such manner that, when the spring is in the compressed position (FIG. 18), its axial overall size is equal to the axial dimension of its mean section. If the spring is made from a round-sectioned wire, this axial dimension is equal to the diameter of the wire. In this embodiment, the bearing surfaces 42 are relatively wide and this stabilizes the spring and allows a rotary sliding under load without wear. Moreover, the end portions of the spring have an increased flexibility and a strength which impart a maximum load capacity to this spring.

In the illustrated embodiment, the centering is achieved internally, that is to say the envelope of the inner surface 43 of the spring, is cylindrical. It will be understood that this centering could also be achieved externally.

FIGS. 18 and 19 illustrate diagrammatically a process for producing such a spring comprising: starting with a spring having adjoining coils obtained in the known manner and a coiling diameter exceeding by about 25% the desired diameter of the spring to be produced, cutting off coil blanks 50 and accentuating the curvature of the end portions 51 thereof as shown in FIG. 18. Then, this coil is flattened by a press operation between two plates 52, 53 which are inclined with respect to each other at a slope of 3 to 10%, depending on the diameter of the wire and the coiling diameter, so that the thickness of the end portions represents about 20 to 40% of the diameter of the wire (FIG. 19).

In the course of this flattening operation, the end portions of the coil, whose curvature has been previously accentuated, resume a regular curvature along their inner edges. A last forming operation comprises coiling the part in a spiral on a shaft having a smaller diameter so that, after the elastic return, the inside diameter and the height of the spring in the free state have the desired values. A hardening operation terminates the production process.

Having now described our invention what we claim as new and desire to secure by Letters Patent is:

1. In a structure comprising a trunnion of a homokinetic joint, a shoulder on the trunnion, a roller rotatably and axially slidably mounted on the trunnion and having an annular end face confronting said shoulder, and means for biasing the roller axially outwardly of the trunnion away from the shoulder; the improvement wherein said roller biasing means comprise a helical coil spring of metal wire coaxial with said trunnion and said roller and freely rotatably mounted for operation in a given compressed condition between the shoulder and the roller and in contact with the shoulder and the end face of the roller, the coil spring having a small axial and radial overall size and comprising a single coil of said wire whose overall size axially of the spring is equal to the thickness of said wire in the maximum possible compressed condition of the spring and whose maximum deflection between a free uncompressed condition of the spring and said maximum possible compressed condition of the spring is substantially between 6 and 10 times said overall size in said maximum possible compressed condition, the roller having an axial position relative to the shoulder in operation of the homokinetic joint which is such that said given compressed condition is substantially but not quite said maximum possible compressed condition, the coil spring having end portions having surfaces which confront said shoulder and said end face of the roller but extend at an angle relative to a plane perpendicular to the axis of the spring which is less than the helix angle of the rest of the spring in the compressed condition of the spring.

2. A structure as claimed in claim 1, wherein the spring is in contact at two points with the roller and with the shoulder.

3. A structure as claimed in claims 1 or 2, wherein the spring has a deflection in said given compressed condition which varies in operation of the structure to an extent whose magnitude is less than the magnitude of said axial overall size in said maximum possible compressed condition of the spring.

4. A structure as claimed in claim 1, wherein the coil extends through an angle slightly less that 360°.

5. A structure as claimed in claim 4, wherein the spring comprises free end portions which are curved in a direction for reducing the pitch of the helix of the spring in a free uncompressed state of the spring.

6. A structure as claimed in claim 4, wherein the spring is flattened in the vicinity of ends of the spring, the spring having end surfaces which are slightly convex for contacting said roller and said shoulder.

7. A structure as claimed in claim 6, wherein said convex surfaces are cylindrical and have generatrices which are oriented substantially in a direction orthogonal to the mean line of the spring.

8. A structure as claimed in claim 1, wherein the coil extends through an angle exceeding 360° and portions of the spring which overlap have a thickness which progressively decreases in the direction toward free ends of the spring.

9. A structure as claimed in claim 4, wherein the coil extends through an angle of between 420° and 540°.

10. A structure as claimed in claim 4, wherein said coil has a substantially constant cross sectional area.

* * * * *